(12) United States Patent
Yao et al.

(10) Patent No.: US 11,661,851 B1
(45) Date of Patent: May 30, 2023

(54) TURBOMACHINE AND METHOD OF ASSEMBLY

(71) Applicant: General Electric Company, Schenectady, NY (US)

(72) Inventors: Jixian Yao, Niskayuna, NY (US); Trevor H. Wood, Clifton Park, NY (US); Kishore Ramakrishnan, Rexford, NY (US); William J. Solomon, Montgomery, OH (US); Giridhar Jothiprasad, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/986,544

(22) Filed: Nov. 14, 2022

(51) Int. Cl.
*F01D 5/14* (2006.01)
*F04D 29/32* (2006.01)
*B64D 27/10* (2006.01)

(52) U.S. Cl.
CPC ............ *F01D 5/142* (2013.01); *B64D 27/10* (2013.01); *F04D 29/322* (2013.01)

(58) Field of Classification Search
None
See application file for complete search history.

(56) References Cited

U.S. PATENT DOCUMENTS

| | | | |
|---|---|---|---|
| 7,374,403 B2 * | 5/2008 | Decker | ................... F01D 5/141 416/223 R |
| 8,678,743 B1 | 3/2014 | Sheridan | |
| 8,753,065 B2 | 6/2014 | Sheridan | |
| 8,807,916 B2 | 8/2014 | Sheridan | |
| 8,814,494 B1 | 8/2014 | Sheridan | |
| 8,973,374 B2 | 3/2015 | Sharma | |
| 9,816,443 B2 | 11/2017 | Sheridan | |
| 10,371,047 B2 | 8/2019 | Schwarz | |
| 10,823,052 B2 | 11/2020 | Schwarz | |

FOREIGN PATENT DOCUMENTS

| | | |
|---|---|---|
| CN | 103244350 | 8/2013 |
| EP | 2870346 | 5/2015 |
| WO | 2014008051 | 1/2014 |

OTHER PUBLICATIONS

M. Rodrigues, et al. "Aerodynamic Investigation of a Composite Low-Speed Fan for UHBR Application," Journal of Turbomachinery 143.10 (2021): 101004.

* cited by examiner

*Primary Examiner* — Kayla Mccaffrey
(74) *Attorney, Agent, or Firm* — Fitch, Even, Tabin & Flannery LLP

(57) ABSTRACT

A turbomachine includes an annular casing and a fan disposed inside the annular casing and mounted for rotation about an axial centerline. The fan includes fan blades that extend radially outwardly toward the annular casing. The fan has an average chord fan width according to a first performance factor. The fan has a quantity of fan blades according to a second performance factor.

20 Claims, 3 Drawing Sheets

TURBOMACHINE AND METHOD OF ASSEMBLY

FIELD

The present disclosure relates generally to jet engines and, more particularly, to jet engine fans.

BACKGROUND

In one form, a gas turbine engine can include a fan and a core arranged in flow communication with one another. The core generally includes, in serial flow order, a compressor section, a combustion section, a turbine section, and an exhaust section. The fan and the core may be partially surrounded by an outer nacelle. In such approaches, the outer nacelle defines a bypass airflow passage with the core.

In operation, air is provided from the fan to an inlet of the compressor section where one or more axial compressors progressively compress the air until it reaches the combustion section. Fuel is mixed with the compressed air using one or more fuel nozzles within the combustion section and burned to provide combustion gases. The combustion gases are routed from the combustion section to the turbine section. The flow of combustion gasses through the turbine section drives the turbine section and is then routed through the exhaust section to atmosphere.

BRIEF DESCRIPTION OF THE DRAWINGS

A full and enabling disclosure of the present disclosure, including the best mode thereof, directed to one of ordinary skill in the art, is set forth in the specification, with reference to the appended figures, in which.

Figure 1:
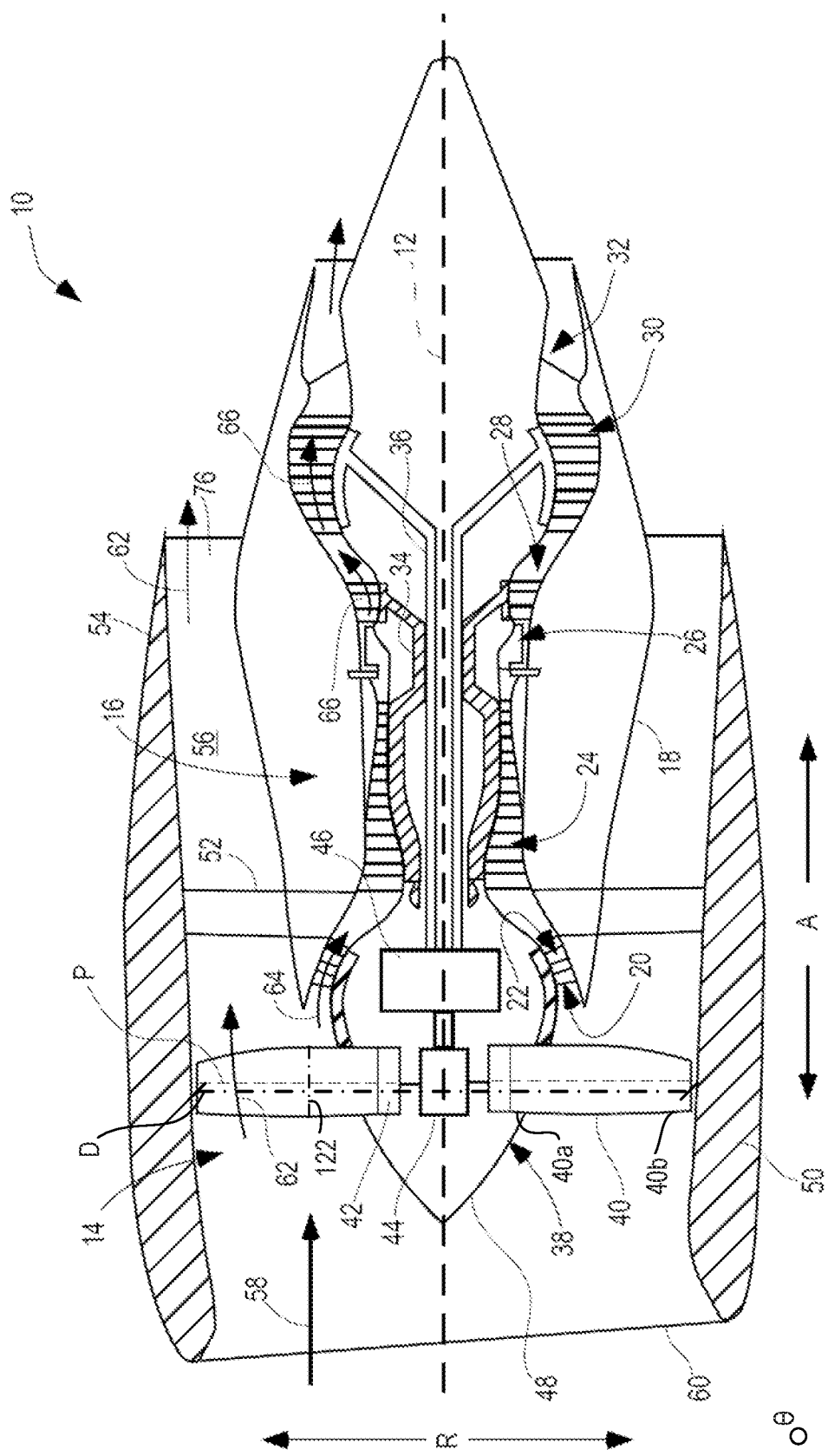
FIG. 1 is a schematic, cross-sectional view of a gas turbine engine in accordance with exemplary aspects of the present disclosure.

Elements in the figures are illustrated for simplicity and clarity and have not necessarily been drawn to scale. For example, the dimensions and/or relative positioning of some of the elements in the figures may be exaggerated relative to other elements to help to improve understanding of variations of the present disclosure. Also, common but well-understood elements that are useful or necessary in a commercially feasible embodiment are often not depicted in order to facilitate a less obstructed view of these variations of the present disclosure. Certain actions and/or steps may be described or depicted in a particular order of occurrence while those skilled in the art will understand that such specificity with respect to sequence is not actually required.

DETAILED DESCRIPTION

Aspects and advantages of the present disclosure will be set forth in part in the following description or may be learned through practice of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first" and "second" may be used interchangeably to distinguish one component from another and are not intended to signify location or importance of the individual components.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

The terms "radial" or "radially" refer to a direction away from a common center. For example, in the overall context of a turbine engine, radial refers to a direction along a ray extending between a center longitudinal axis of the engine and an outer engine circumference.

The singular forms "a", "an", and "the" include plural references unless the context clearly dictates otherwise.

The inventors have sought to maximize efficiency of turbine engines during in-flight propulsion of an aircraft, and correspondingly reduce fuel consumption. In particular, the inventors were focused on how the fan of a ducted turbine engine can be improved. The inventors, in consideration of several different engine architectures proposed, considered how the fan module would need to change to achieve mission requirements, and/or how the fan module could improve upon an existing engine efficiency and/or fuel consumption. The inventors looked at several engine architectures, then determined how the number of fan blades utilized with a fan, average chord width of the fan blades, diameter of the fan blade, fan pressure ratio, fan tip speed, and hub-to-tip ratio affect engine efficiency and/or fuel consumption.

The inventors found that in some engines, an excess number of fan blades may add unnecessary cost to the engine design without appreciable benefit, and may also add unnecessary weight to an aircraft, thereby reducing overall fuel efficiency (e.g., due to increased fuel burn). A reduction in fan blade quantity, however, was found to potentially lead to a reduction in total fan blade area desired for efficient propulsion, fan aeromechanical stability and operability, etc. The inventors considered increasing the width or fan chord of the fan blades to achieve a desired fan blade area with a lower fan blade count. Such considerations were found to be of particular interest when the engine had a higher bypass ratio (i.e., lower fan pressure ratio), and when the engine had a lower blade tip speed.

The determination of the fan blade count and average fan chord for achieving a desired efficiency often required a time consuming, iterative process. As explained in greater detail below, after evaluation of numerous turbine engine architectures having different fan blade counts and average fan chords, it was found, unexpectedly, that there exist certain relationships between a fan or fan blade diameter, a fan pressure ratio, and a redline corrected fan tip speed of the turbine engine that identify an average fan chord needed to produce improved results in terms of engine efficiency. It was further found, unexpectedly, that there exist certain relationships between turbine engine parameters including a hub-to-tip ratio of the fan, a fan pressure ratio, and a redline corrected fan tip speed of the turbine engine that identify a fan blade count needed to produce improved results in terms of engine efficiency.

Various aspects of the present disclosure describe aspects of an aircraft turbine engine characterized in part by an increased average fan chord width and a reduced blade count, which are believed to result in an improved engine aerodynamic efficiency and/or improved fuel efficiency. According to the disclosure, a turbomachine for powering an aircraft in flight comprises an annular casing and a fan disposed inside the annular casing and mounted for rotation about an axial centerline, the fan including fan blades that extend radially outwardly toward the annular casing. In one aspect, a First Performance Factor (FPF) for a fan module is expressed according to the inequality $[c/D]/[\sqrt{FPR-1}/U_{c(tip)}] > m_1 \cdot U_{c(tip)} + y_1$. In another aspect, a Second Performance Factor (SPF) for a fan module is expressed in terms of the inequality $$\sqrt{\frac{\pi}{4} \cdot \left(\frac{1-HTR^2}{BC}\right)} \Big/ \left[\frac{\sqrt{FPR-1}}{U_{c(tip)}}\right] > m_2 \cdot U_{c(tip)} + y_2.$$

Reference will now be made in detail to embodiments of the disclosure, one or more examples of which are illustrated in the accompanying drawings, which are incorporated in and constitute a part of this specification, illustrate embodiments of the disclosure and, together with the description, serve to explain the principles of the disclosure. The detailed description uses numerical and letter designations to refer to features in the drawings. Like or similar designations in the drawings and description have been used to refer to like or similar parts of the disclosure.

Referring now to the drawings, wherein identical numerals indicate the same elements throughout the figures, FIG. 1 is a schematic, cross-sectional view of a turbomachine, more specifically a gas turbine engine, in accordance with an exemplary embodiment of the present disclosure. More particularly, for the embodiment of FIG. 1, the gas turbine engine is a high-bypass turbofan jet engine 10, referred to herein as "turbofan jet engine 10." As shown in FIG. 1, the turbofan jet engine 10 defines an axial direction A (extending parallel to a longitudinal centerline 12 provided for reference) and a radial direction R. In general, the turbofan jet engine 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the high pressure turbine 28 to the high pressure compressor 24. A low pressure (LP) shaft or spool 36 drivingly connects the low pressure turbine 30 to the low pressure compressor 22.

Fan blades 40 extend outwardly from disk 42 generally along the radial direction R. For the embodiment depicted, the fan section 14 includes a variable pitch fan 38 having a plurality of fan blades 40 coupled to a disk 42 in a spaced apart manner. One or more of the fan blades 40 may rotatable relative to the disk 42 about a pitch axis P by virtue of the fan blades 40 being operatively coupled to a suitable actuation member 44 configured to vary the pitch of the fan blades 40, typically collectively in unison. In some approaches, the fan is a fixed pitch fan and actuation member 44 is not present. The fan blades 40, disk 42, and actuation member 44 may be together rotatable about the longitudinal centerline 12 by low pressure spool 36 across a power gear box 46. The power gear box 46 includes a plurality of gears for stepping down the rotational speed of the low pressure spool 36 to a more efficient rotational fan speed. In some approaches, the low pressure spool 36 may directly drive the fan without power gear box 46.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the variable pitch fan 38 and/or at least a portion of the core turbine engine 16. It should be appreciated that the outer nacelle 50 may be configured to be supported relative to the core turbine engine 16 by a plurality of circumferentially-spaced outlet guide vanes 52. Moreover, a downstream section 54 of the outer nacelle 50 may extend over an outer portion of the core turbine engine 16 so as to define a bypass airflow passage 56 therebetween.

During operation of the turbofan jet engine 10, a volume of air 58 enters the turbofan jet engine 10 through an associated inlet 60 of the outer nacelle 50 and/or fan section 14. As the volume of air 58 passes across the fan blades 40, a first portion 62 of the air 58 as indicated by arrow 62 is directed or routed into the bypass airflow passage 56 and a second portion 64 of the air 58 as indicated by arrow 64 is directed or routed into the low pressure compressor 22. The ratio between the first portion 62 of air 58 and the second portion 64 of air 58 is commonly known as a bypass ratio. The pressure of the second portion 64 of air 58 is then increased as it is routed through the high pressure (HP) compressor 24 and into the combustion section 26, where it is mixed with fuel and burned to provide combustion gases 66. Subsequently, the combustion gases 66 are routed through the high pressure turbine 28 and the low pressure turbine 30, where a portion of thermal and/or kinetic energy from the combustion gases 66 is extracted.

The combustion gases 66 are then routed through the jet exhaust nozzle section 32 of the core turbine engine 16 to provide propulsive thrust. Simultaneously, the pressure of the first portion 62 of air 58 is substantially increased as the first portion 62 of air 58 is routed through the bypass airflow passage 56 before it is exhausted from a fan nozzle exhaust section 76 of the turbofan jet engine 10, also providing propulsive thrust.

It should be appreciated, however, that the turbofan jet engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan jet engine 10 may instead be any other suitable aeronautical gas turbine engine, such as a turbojet engine, turboshaft engine, turboprop engine, etc. Additionally, in still other exemplary embodiments, the turbofan jet engine 10 may include or be operably connected to any other suitable accessory systems. Additionally, or alternatively, the exemplary turbofan jet engine 10 may not include or be operably connected to one or more of the accessory systems discussed above.

Figure 2:
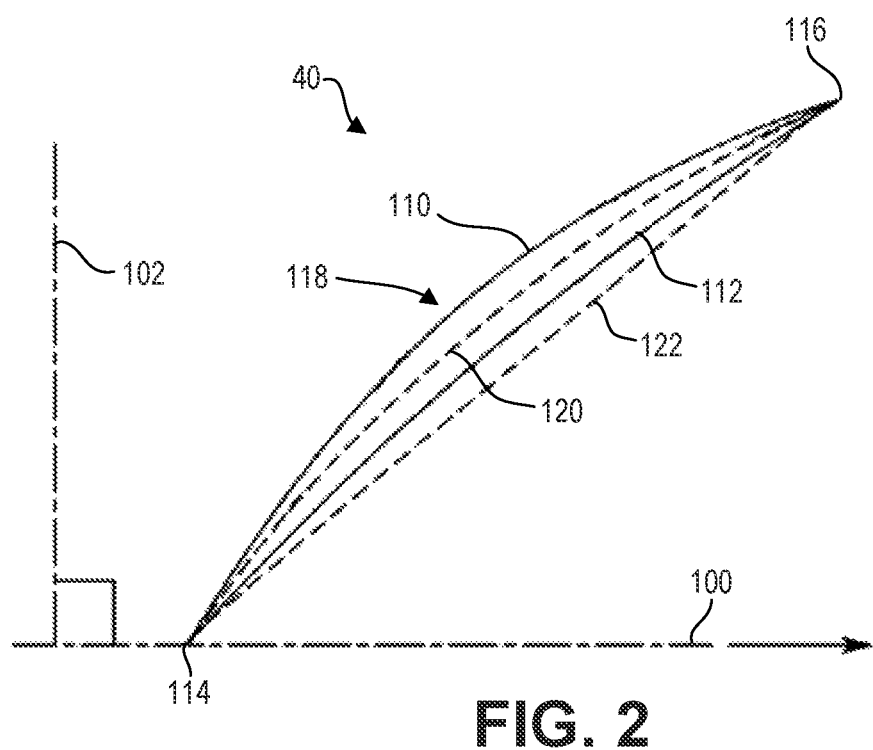
FIG. 2 is a sectional view of a fan blade in accordance with exemplary aspects of the present disclosure.

FIG. 2 is a sectional view of a fan blade 40 viewed radially (e.g., towards the rotation axis). A first axis 100 is parallel to the axial direction A of FIG. 1, and a second axis 102 is parallel to the circumferential direction θ.

Fan blade 40 includes a low-pressure surface 110 and an opposite high-pressure surface 112 that each extend between a proximal end 40a and a distal end 40b of the fan blade 40

(shown in FIG. 1). Fan blade 40 further includes a leading edge 114 and a trailing edge 116.

The low-pressure surface 110, high-pressure surface 112, leading edge 114, and trailing edge 116 form a profile 118 of the fan blade 40. The profile 118 defines a mean camber 120 that extends from the leading edge 114 to the trailing edge 116 and that is equidistant from the low-pressure surface 110 and the high-pressure surface 112.

The profile 118 further defines a local chord 122 (relative to a specific cross section through the blade) that represents a straight-line distance from the leading edge 114 to the trailing edge 116.

In some approaches, a fan blade 40 may have a profile 118 that varies along a radial height of the fan blade 40 between the proximal end 40a and the distal end 40b. For example, in some fan blade designs, a distance between the leading edge 114 and the trailing edge 116 may be greater at the proximal end 40a of the fan blade 40 than at the distal end 40b. As such, the length of the chord line 122 may vary along the radial height of the fan blade 40. In this way, an average chord line length may be derived for the fan blade that accounts for the variation in chord line lengths 122 along the radial height of the fan blade 40.

As mentioned earlier, the inventors have discovered relationships between timescales that include a fan pressure ratio, fan diameter, and corrected fan tip speed during the course of improving upon the fan module portion of various engine architectures. More particularly, and as discussed in greater detail below, the inventors have discovered relationships between ratio of axial flow timescales to rotation timescales, and suitable parameters for implementing those relationships with an engine.

The aircraft turbine engine architectures developed by the inventors include as major components a fan module and an engine core. The core includes one or more compressor stages and turbine stages. Compressor stages typically include high pressure and low pressure compressor stages, and turbines similarly include high and low pressure stages. The fan module that provides for an improved efficiency is not independent of these other parts of the engine, because there is always a trade benefit when one part is improved or modified. Improved efficiency brought by the fan can be in terms of a reduction in weight, lower installed drag, load balancing or management (dynamic or static loading), aerodynamic efficiency through the fan duct/interaction of fan to output guide vanes, and other factors. In an effort to improve upon what the fan can deliver (positive benefit of fan design) there often times need to be sacrifices in other parts of the engine (negative benefit of fan design). Or the benefits of a new fan design when viewed independent of a particular core design or airframe requirement, often times requires revision or is unrealistic given the impact that such a fan design will have on other parts of the engine, e.g., compressor operating margin, balance of a fan and output guide vanes (OGV) along with a power gearbox, and location of a low pressure compressor (packaging impacts).

The inventors, proceeding in the manner of designing improved fan modules, accounting for the trade-offs between fan module improvements and other potentially negative or limitations on fan module design, unexpectedly found certain relationships that define an improved fan design, now described in detail.

In one aspect, the inventors have discovered a relationship between an average fan chord "c", a fan diameter "D" (e.g., a tip-to-tip dimension of the fan), a fan pressure ratio "FPR" of a fan, and a corrected fan tip speed "$U_{c(tip)}$" according to the below relationship, referred to herein as the First Performance Factor (FPF) for a fan module:

$$FPF = [c/D]/[\sqrt{FPR-1}/U_{c(tip)}] \quad (1)$$

$$0.24 * U_{c(tip)} + 489 > FPF > 0.24 * U_{c(tip)} - 12 + dy_1 \quad (2)$$

The term $dy_1$ is defined below. The ratio of average fan chord "c" to fan diameter "D" is a nondimensionalized chord width ratio greater than 0.1 (e.g., greater than 0.15, greater than 0.17, or greater than 0.19), and less than 0.3 (e.g., less than 0.21).

As used herein, the "fan pressure ratio" (FPR) refers to a ratio of a stagnation pressure immediately downstream of the plurality of outlet guide vanes 52 during operation of the fan 38 to a stagnation pressure immediately upstream of the plurality of fan blades 40 during the operation of the fan 38. The "$\sqrt{FPR-1}$" portion of the average fan chord relationship may be utilized as a surrogate for referencing a proportionality to the increase in axial flow velocity through the fan. The fan pressure ratio is greater than 1.2 (e.g., greater than 1.3), and less than 1.5 (e.g., less than 1.45, less than 1.42, or less than 1.4).

As used herein, "$U_{c(tip)}$" is a corrected fan tip speed at redline (e.g., maximum permissible rotational speed of the fan at a redline shaft speed, which is either directly coupled to the fan or through a reduction gearbox). The "fan tip speed" defined by the plurality of fan blades 40 refers to a linear speed of an outer tip of a fan blade 40 during operation of the fan 38. The corrected fan tip speed may be provided, for example, as ft/sec divided by an industry standard temperature correction. In an example approach, the corrected fan tip speed may be less than 1,500 ft/sec (e.g., less than 1,250 ft/sec or less than 1,100 ft/sec), and greater than 500 ft/sec.

FPF, as defined in (1), may be thought of as representing a ratio of speeds. When considered with the normalized chord width "c/D," FPF may be thought of as a correlation of timescales of the blade rotation with the time taken for a flow particle to traverse a fan average chord length when the engine is operating at static conditions.

Figure 3:
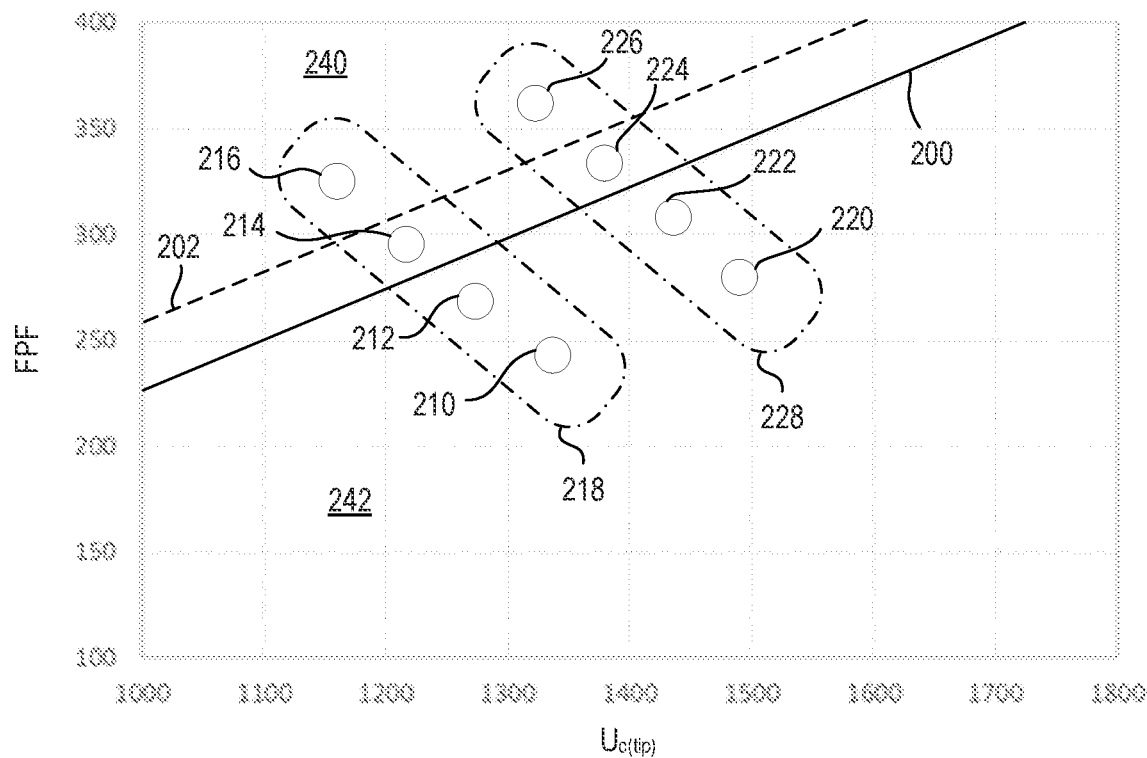
FIG. 3 shows first example engines arranged on a first plot in accordance with a first performance factor for a fan module according to the present disclosure.

Referring to the plot of FIG. 3, the FPF increases in value along the Y-axis, while the X-axis represents left-to-right increasing redline corrected fan tip speed ($U_{c(tip)}$). FPF values falling on line 200 are equal to $0.24*U_{c(tip)}-12$. FIG. 3 shows eight example engine embodiments having unique FPF values. They are engines 210, 212, 214, 216 that may be referred to as low speed engine designs (as indicated by subplot area 218), and engines 220, 222, 224, 226 that may be referred to as high speed engine designs (as indicated by subplot area 228).

As represented by the FPF, which indicates a particular fan chord relationship, the inventors discovered a limited or narrowed selection of average fan chords that uniquely take into consideration other factors associated with the fan and engine type. For instance, the inventors determined that an engine having an FPF value for a given $U_{c(tip)}$ above line 200 (within plot area 240) may allow for relatively wider chord widths as compared to engines having an FPF value for a given $U_{c(tip)}$ below line 200 (within plot area 242). In this way, engines 214, 216, 224, and 226 may provide advantages over engines 210, 212, 220, and 222, such as a reduced fan blade count (discussed in greater detail below), increased aeromechanical stability and reduced fan lift coefficient CL during takeoff of the aircraft. In some instances, such advantages may become more pronounced as FPF increases and $U_{c(tip)}$ decreases (for next generation ultra-high bypass ratio engines for instance); for example, the improvement in engine performance based on the redline tip speed may have FPF values greater than $0.24*U_{c(tip)}-4.5$, greater than $0.24*U_{c(tip)}+4$, or greater than $0.24*U_{c(tip)}+14$ (these other examples are generally represented by the phantom line 202). Stated differently, these fan chord relationships in terms of FPF values (line 202 representing lower bound thereof) can be more generally represented as $FPF>0.24U_{c(tip)}-12+dy_1$, where $dy_1$ is equal to 7.5, 16, 25. The $dy_1$ value can vary between 0 and 500, 0 and 7.5, 7.5 and 16, 16 and 25, or a value greater than 25 and less than 500.

In another aspect, the inventors have discovered a relationship between a fan blade count "BC", a hub-to-tip ratio of a fan "HTR", a fan pressure ratio "FPR" of a fan, and a corrected fan tip speed "$U_{c(tip)}$" according to the below relationship, referred to herein as the Second Performance Factor (SPF) for a fan module:

$$SPF = \sqrt{\frac{\pi}{4}\left(\frac{1-HTR^2}{BC}\right)} / \left[\frac{\sqrt{FPR-1}}{U_{c(tip)}}\right] \quad (3)$$

$$0.15*U_{c(tip)} + 654 > SPF > 0.15*U_{c(tip)} + 153 + dy_2 \quad (4)$$

The term dye is defined below. Regarding the hub-to-tip ratio "HTR", a fan blade defines a hub radius ($R_{hub}$), which is the radius of the leading edge at the hub relative to a centerline of the fan, and a tip radius ($R_{tip}$), which is the radius of the leading edge at a tip of the fan blade relative to the centerline of the fan. HTR is the ratio of the hub radius to the tip radius ($R_{hub}/R_{tip}$). The ratio is greater than 0.1 and less than 0.5 (e.g., less than 0.275, less than 0.25, or less than 0.225).

Blade count "BC" corresponds to the number of fan blades circumferentially arranged about the fan hub. The blade count is between 10 fan blades and 40 fan blades. In certain example approaches, the blade count is less than or equal to 18 fan blades (e.g., 16 or fewer fan blades).

"FPR" and "$U_{c(tip)}$" refer to fan pressure ratio and corrected fan tip speed at redline, respectively, as discussed with respect to the average fan chord relationship above. In this way, the values of FPR and/or $U_{c(tip)}$ may the same as or similar to those discussed with respect to the average fan chord relationship.

Figure 4:
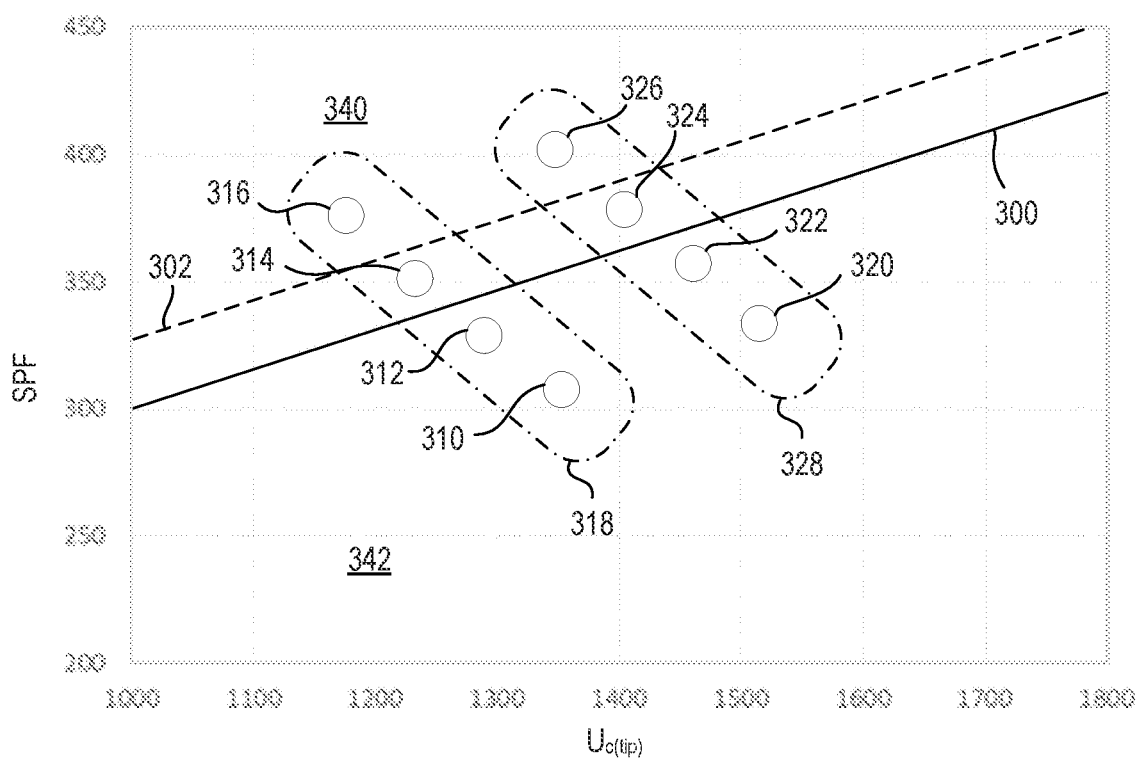
FIG. 4 shows second example engines arranged on a second plot in accordance with a second performance factor for a fan module according to the present disclosure.

Referring to FIG. 4, the SPF increases in value along the Y-axis, while the X-axis represents left-to-right increasing redline corrected fan tip speed ($U_{c(tip)}$, as R/L $U_{c(tip)}$. SPF values falling on line 300 are equal to $0.15U_{c(tip)}+153$. FIG. 4 shows six example engine embodiments having unique SPF values. They are engines 310, 312, 314, 316 that may be referred to as low speed engine designs (as indicated by subplot area 318), and engines 320, 322, 324, 326 that may be referred to as high speed engine designs (as indicated by subplot area 328).

As represented by the SPF, which indicates a particular fan blade count relationship, the inventors discovered a limited or narrowed selection of fan blade count that uniquely take into consideration other factors associated with the fan and engine type. For instance, the inventors determined that an engine having an SPF value for a given $U_{c(tip)}$ that is above line 300 (within plot area 340) may allow for reduced fan blade counts as compared to engines having an SPF value for a given $U_{c(tip)}$ below line 300 (within plot area 342). In this way, engines 314, 318, 324, and 328 may provide advantages over engines 310, 312, 320, and 322, such as a reduced cost and weight. In some instances, such advantages may become more pronounced as the SPF value increases and the $U_{c(tip)}$ decreases (for next generation ultra-high bypass ratio engines for instance); for example, the improvement in engine performance based on the redline tip speed may have SPF values greater than $0.15*U_{c(tip)}+158$, greater than $0.15*U_{c(tip)}+163$, or greater than $0.15*U_{c(tip)}+168$ (these other examples are generally represented by the phantom line 302). Stated differently, these fan blade count relationships in terms of SPF values (line 302 representing lower bound thereof) can be more generally represented as $SPF>0.15U_{c(tip)}+153+dy_2$, where $dy_2$ is equal to, for example, 5, 10, 15. The $dy_2$ value can vary between 0 and 500, 0 and 15, or a value greater than 15 and less than 500.

In this way, using fan parameters such as fan pressure ratios, corrected fan tip speeds, fan diameters, and hub-to-tip ratios, the inventors discovered approaches that utilize the above-described average fan chord relationship to obtain an average chord width, and the above-described fan blade count relationship to obtain a fan blade count. These obtained constraints guide one to select fan chord width, blade count, or both suited for the particularized engine architectures and mission requirements, informed by engine-unique environments and trade-offs in design (as discussed above), which are believed to result in an improved engine.

In another aspect, the FPF and SPF may also be useful as a design tool for down-selecting, or providing a guideline for reducing the number of candidate designs for fan blade counts and average fan chords from which to design a fan module for a particular architecture. In this way, an engine architecture is improved overall by knowing, early in the design process, what constraints or limitations would be imposed by a fan module given the mission objectives.

In another aspect method of assembly is provided. The method includes mounting a fan inside an annular casing for rotation about an axial centerline. The fan including fan blades that extend radially outwardly toward the annular casing. The fan further includes an average fan chord width according to the First Performance Factor ("FPF") and/or a quantity of fan blades according to the Second Performance Factor ("SPF") discussed above.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A turbomachine for an aircraft, comprising: an annular casing; and a fan disposed inside the annular casing and mounted for rotation about an axial centerline, the fan including fan blades that extend radially outwardly toward the annular casing; wherein the fan includes an average fan chord width of the fan blades ("c"), a diameter of the fan ("D"), a fan pressure ratio ("FPR"), and a redline corrected fan tip speed ("$U_{c(tip)}$"), according to a First Performance Factor; wherein $FPF=[c/D]/[\sqrt{FPR-1}/U_{c(tip)}]$; and wherein $0.24*U_{c(tip)}+489>FPF>0.24*U_{c(tip)}-12+dy_1$ and wherein $0<dy_1<500$.

The turbomachine of one or more of these clauses wherein ratio c/D is within a range equal to or greater than 0.1 and equal to or less than 0.3.

The turbomachine of one or more of these clauses wherein ratio c/D is within a range equal to or greater than 0.15 and equal to or less than 0.21.

The turbomachine of one or more of these clauses wherein ratio c/D is equal to or greater than 0.1.

The turbomachine of one or more of these clauses wherein ratio c/D is equal to or less than 0.3.

The turbomachine of one or more of these clauses wherein FPR is within a range equal to or greater than 1.2 and equal to or less than 1.5.

The turbomachine of one or more of these clauses wherein FPR is within a range equal to or greater than 1.3 and equal to or less than 1.45.

The turbomachine of one or more of these clauses wherein FPR is equal to or greater than 1.2.

The turbomachine of one or more of these clauses wherein FPR is equal to or greater than 1.3.

The turbomachine of one or more of these clauses wherein FPR is equal to or less than 1.5.

The turbomachine of one or more of these clauses wherein FPR is equal to or less than 1.45.

The turbomachine of one or more of these clauses wherein $U_{c(tip)}$ is within a range equal to or greater than 500 ft/sec and equal to or less than 1,500 ft/sec.

The turbomachine of one or more of these clauses wherein $U_{c(tip)}$ is within a range equal to or greater than 500 ft/sec and equal to or less than 1,250 ft/sec.

The turbomachine of one or more of these clauses wherein $dy_1$ is equal to or greater than 7.5 and equal to or less than 500.

The turbomachine of one or more of these clauses wherein $dy_1$ is equal to or greater than 16 and equal to or less than 500.

The turbomachine of one or more of these clauses wherein $dy_1$ is equal to or greater than 25 and equal to or less than 500.

A turbomachine comprising: an annular casing; and a fan disposed inside the annular casing and mounted for rotation about an axial centerline, the fan including fan blades that extend radially outwardly toward the annular casing; wherein the fan includes a fan hub-to-tip ratio ("HTR"), a fan blade count ("BC"), a fan pressure ratio ("FPR"), and a redline corrected fan tip speed ("$U_{c(tip)}$") according to a Second Performance Factor ("SPF"); wherein $$SPF = \sqrt{\frac{\pi}{4}\left(\frac{1-HTR^2}{BC}\right)} / \left[\frac{\sqrt{FPR-1}}{U_{c(tip)}}\right];$$

and wherein $0.15*U_{c(tip)}+654>SPF>0.15*U_{c(tip)}+153+dy_2$ and wherein $0<dy_2<500$.

The turbomachine of one or more of these clauses wherein HTR is within a range equal to or greater than 0.1 and equal to or less than 0.5.

The turbomachine of one or more of these clauses wherein HTR is within a range equal to or greater than 0.2 and equal to or less than 0.275.

The turbomachine of one or more of these clauses wherein HTR is within a range equal to or greater than 0.2 and equal to or less than 0.25.

The turbomachine of one or more of these clauses wherein HTR is equal to or greater than 0.1.

The turbomachine of one or more of these clauses wherein HTR is equal to or less than 0.5.

The turbomachine of one or more of these clauses wherein BC is within a range equal to or greater than 10 and equal to or less than 18.

The turbomachine of one or more of these clauses wherein FPR is within a range equal to or greater than 1.2 and equal to or less than 1.5.

The turbomachine of one or more of these clauses wherein FPR is within a range equal to or greater than 1.3 and equal to or less than 1.45.

The turbomachine of one or more of these clauses wherein FPR is equal to or greater than 1.2.

The turbomachine of one or more of these clauses wherein FPR is equal to or greater than 1.3.

The turbomachine of one or more of these clauses wherein FPR is equal to or less than 1.5.

The turbomachine of one or more of these clauses wherein FPR is equal to or less than 1.45.

The turbomachine of one or more of these clauses wherein $U_{c(tip)}$ is within a range equal to or greater than 500 ft/sec and equal to or less than 1,500 ft/sec.

The turbomachine of one or more of these clauses wherein $U_{c(tip)}$ is within a range equal to or greater than 500 ft/sec and equal to or less than 1,250 ft/sec.

The turbomachine of one or more of these clauses wherein $dy_2$ is equal to 5 and equal to or less than 500.

The turbomachine of one or more of these clauses wherein $dy_2$ is equal to 10 and equal to or less than 500.

The turbomachine of one or more of these clauses wherein $dy_2$ is equal to 15 and equal to or less than 500.

A method of assembly, comprising: mounting a fan inside an annular casing for rotation about an axial centerline, the fan including fan blades that extend radially outwardly toward the annular casing; wherein the fan includes an average fan chord width of the fan blades ("c"), a diameter of the fan ("D"), a fan pressure ratio ("FPR"), and a redline corrected fan tip speed ("$U_{c(tip)}$") according to a First Performance Factor ("FPF"), wherein: $FPF=[c/D]/[\sqrt{FPR-1}/U_{c(tip)}]$; and $0.24*U_{c(tip)}+489>FPF>0.24*U_{c(tip)}-12+dy_1$ and wherein $0<dy_1<500$; or wherein the fan includes a fan hub-to-tip ratio ("HTR"), a fan blade count ("BC"), FPR, and $U_{c(tip)}$ according to a Second Performance Factor ("SPF"), wherein:

$$SPF = \sqrt{\frac{\pi}{4}\left(\frac{1-HTR^2}{BC}\right)} / \left[\frac{\sqrt{FPR-1}}{U_{c(tip)}}\right];$$

and $0.15*U_{c(tip)}+654>SPF>0.15*U_{c(tip)}+153+dy_2$ and wherein $0<dy_2<500$.

What is claimed is:

1. A turbomachine for an aircraft comprising:
an annular casing; and
a fan disposed inside the annular casing and mounted for rotation about an axial centerline, the fan including fan blades that extend radially outwardly toward the annular casing;
wherein the fan includes an average fan chord width of the fan blades ("c"), a diameter of the fan ("D"), a fan pressure ratio ("FPR"), and a redline corrected fan tip speed ("$U_{c(tip)}$") according to a First Performance Factor ("FPF");
wherein $FPF=[c/D]/[\sqrt{FPR-1}/U_{c(tip)}]$; and
wherein $0.24*U_{c(tip)}+489>FPF>0.24*U_{c(tip)}-12+dy_1$ and wherein $0<dy_1<500$.

2. The turbomachine of claim 1, wherein ratio c/D is within a range equal to or greater than 0.1 and equal to or less than 0.3.

3. The turbomachine of claim 1, wherein ratio c/D is within a range equal to or greater than 0.15 and equal to or less than 0.21.

4. The turbomachine of claim 1, wherein FPR is within a range equal to or greater than 1.2 and equal to or less than 1.5.

5. The turbomachine of claim 1, wherein FPR is within a range equal to or greater than 1.3 and equal to or less than 1.45.

6. The turbomachine of claim 1, wherein $U_{c(tip)}$ is within a range equal to or greater than 500 ft/sec and equal to or less than 1,500 ft/sec.

7. The turbomachine of claim 1, wherein $U_{c(tip)}$ is within a range equal to or greater than 500 ft/sec and equal to or less than 1,250 ft/sec.

8. The turbomachine of claim 1, wherein $dy_1$ is equal to or greater than 7.5 and equal to or less than 500.

9. The turbomachine of claim 1, wherein $dy_1$ is equal to or greater than 16 and equal to or less than 500.

10. The turbomachine of claim 1, wherein $dy_1$ is equal to or greater than 25 and equal to or less than 500.

11. A turbomachine comprising:
an annular casing; and
a fan disposed inside the annular casing and mounted for rotation about an axial centerline, the fan including fan blades that extend radially outwardly toward the annular casing;
wherein the fan includes a fan hub-to-tip ratio ("HTR"), a fan blade count ("BC"), a fan pressure ratio ("FPR"), and a redline corrected fan tip speed ("$U_{c(tip)}$") according to a Second Performance Factor ("SPF");
wherein $$SPF = \sqrt{\frac{\pi}{4}\left(\frac{1-HTR^2}{BC}\right)} / \left[\frac{\sqrt{FPR-1}}{U_{c(tip)}}\right];$$

and
wherein $0.15*U_{c(tip)}+654 > SPF > 0.15*U_{c(tip)}+153+dy_2$ and wherein $0 < dy_2 < 500$.

12. The turbomachine of claim 11, wherein HTR is within a range equal to or greater than 0.1 and equal to or less than 0.5.

13. The turbomachine of claim 11, wherein BC is within a range equal to or greater than 10 and equal to or less than 18.

14. The turbomachine of claim 11, wherein FPR is within a range equal to or greater than 1.2 and equal to or less than 1.5.

15. The turbomachine of claim 11, wherein $U_{c(tip)}$ is within a range equal to or greater than 500 ft/sec and equal to or less than 1,500 ft/sec.

16. The turbomachine of claim 11, wherein $U_{c(tip)}$ is within a range equal to or greater than 500 ft/sec and equal to or less than 1,250 ft/sec.

17. The turbomachine of claim 11, wherein $dy_2$ is equal to or greater than 5 and equal to or less than 500.

18. The turbomachine of claim 11, wherein $dy_2$ is equal to or greater than 10 and equal to or less than 500.

19. The turbomachine of claim 11, wherein $dy_2$ is equal to or greater than 15 and equal to or less than 500.

20. A method of assembly, comprising:
mounting a fan inside an annular casing for rotation about an axial centerline, the fan including fan blades that extend radially outwardly toward the annular casing;
wherein the fan includes an average fan chord width of the fan blades ("c"), a diameter of the fan ("D"), a fan pressure ratio ("FPR"), and a redline corrected fan tip speed ("$U_{c(tip)}>$") according to a First Performance Factor ("FPF"), wherein:
$FPF = [c/D]/[\sqrt{FPR-1}/U_{c(tip)}]$; and
$0.24*U_{c(tip)}+489 > FPF > 0.24*U_{c(tip)}-12+dy_1$ and wherein $0 < dy_1 < 500$;
or
wherein the fan includes a fan hub-to-tip ratio ("HTR"), a fan blade count ("BC"), FPR, and $U_{c(tip)}$ according to a Second Performance Factor ("SPF"), wherein:

$$SPF = \sqrt{\frac{\pi}{4}\left(\frac{1-HTR^2}{BC}\right)} / \left[\frac{\sqrt{FPR-1}}{U_{c(tip)}}\right];$$

and
$0.15*U_{c(tip)}+654 > SPF > 0.15*U_{c(tip)}+153+dy_2$ and wherein $0 < dy_2 < 500$.

* * * * *